United States Patent [19]
Mason et al.

[11] 3,972,622
[45] Aug. 3, 1976

[54] ELECTRONIC SURVEY TARGET

[75] Inventors: Mark T. Mason, South Lyndeboro; Michael L. Bourgoine, Jaffrey, both of N.H.

[73] Assignee: New Hampshire Ball Bearings, Inc., Peterborough, N.H.

[22] Filed: Sept. 19, 1974

[21] Appl. No.: 507,461

[52] U.S. Cl. .............................. 356/172; 33/286; 33/293; 250/578; 356/152
[51] Int. Cl.² .................. G01B 11/26; G01C 15/02
[58] Field of Search .................. 356/152, 172, 141; 33/293, 286; 250/578

[56] References Cited
UNITED STATES PATENTS

| | | |
|---|---|---|
| 3,527,539 | 9/1970 | Studebaker .................. 356/156 |
| 3,588,249 | 6/1971 | Studebaker .................. 356/172 |
| 3,588,255 | 6/1971 | Alexander .................... 356/172 |
| 3,819,273 | 6/1974 | Unema et al. ............... 356/152 |
| 3,846,026 | 11/1974 | Waters ........................ 356/152 |
| 3,857,639 | 12/1974 | Mason ......................... 356/172 |
| 3,894,230 | 7/1975 | Rorden et al. ............. 250/203 R |

*Primary Examiner*—Maynard R. Wilbur
*Assistant Examiner*—S. C. Buczinski
*Attorney, Agent, or Firm*—Thomas N. Tarrant

[57] ABSTRACT

A target for acquiring a swept light beam in which four light detectors arranged in a row are connected to operate respective illumination devices and also to a logic network which operates an audible signal only upon activation of all four or exclusively the center two detectors. The target includes a housing which attaches to and is movable upon a grade rod.

1 Claim, 4 Drawing Figures

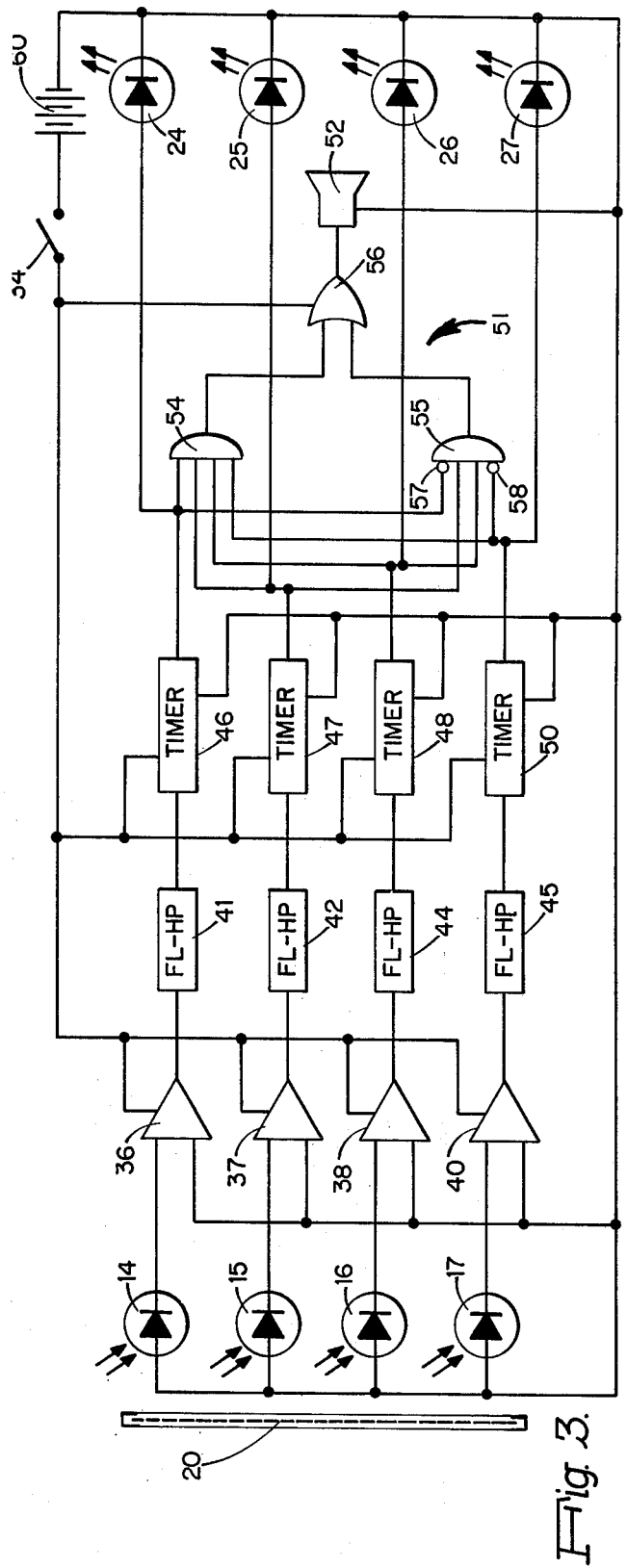
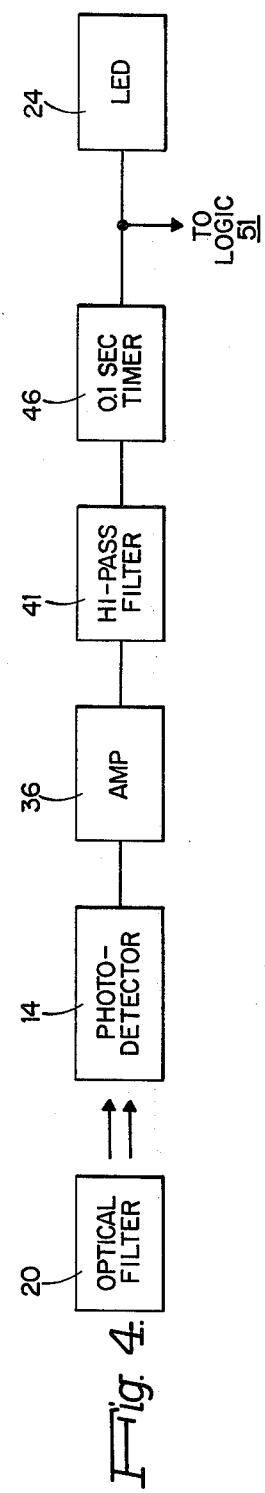
Fig. 3.
Fig. 4.

ELECTRONIC SURVEY TARGET

BACKGROUND OF THE INVENTION

1. Field of the Invention

The invention relates to electronic targets for acquiring light beams used as references in survey and construction.

2. Description of the Prior Art

Targets for acquiring reference beams are commonly adapted for operation in two phases. Phase one is rough beam acquisition. Phase two is precision centering. In my prior application, Ser. No. 427,372 filed Dec. 21, 1973, now U.S. Pat. No. 3,857,639, an electronic target was disclosed in which a lens of relatively large aperture was utilized for rough acquisition and then the aperture was masked with a slot for precision centering. U.S. Pat. No. 3,588,249 to Studebaker and U.S. Pat. No. 3,469,919 to Zellner both describe targets with effectively two detectors which are rough tuned when one detector is activated and are precisely centered by adjusting for a null or the like on an indicating instrument indicating equal signals from both detectors. The former arrangement entails extra cost in optics while the latter requires either matched or compensated detectors.

SUMMARY OF THE INVENTION

In accordance with the present invention, an electronic target is provided which is compact, has low power consumption for battery operation, is economical to manufacture and easy to operate. The inventive target is a four-channel device, each channel having a photodetector at the input end and a light signaling device at the output end. In addition, the output signals are combined in a logic network to drive a sonic indicator only when all four channels are activated or only the center two are activated. The target is enclosed in a housing having a frictional guideway for attachment to and movement upon a grade rod (surveyor's and builder's alignment pole). The target is made in a single unit operated by a self-contained battery. Thus it is an object of the invention to provide a novel electronic target for scanning alignment light beams;

It is a further object of the invention to provide an electronic target for scanning light beams that automatically provides rough positioning by light indication and precision positioning by sonic indication;

It is still a further object of the invention to provide an electronic target for scanning light beams that processes the signals from four light detectors in a logic network to determine precise location of the scanning beam.

Further objects and features of the invention will become apparent upon reading the following description together with the Drawing.

BRIEF DESCRIPTION OF THE DRAWING

FIG. 3 is a simplified diagram of the electronic circuit for the inventive target.

FIG. 4 is a simplified functional block diagram of one channel of FIG. 3.

DESCRIPTION OF THE PREFERRED EMBODIMENT

Figure 1:
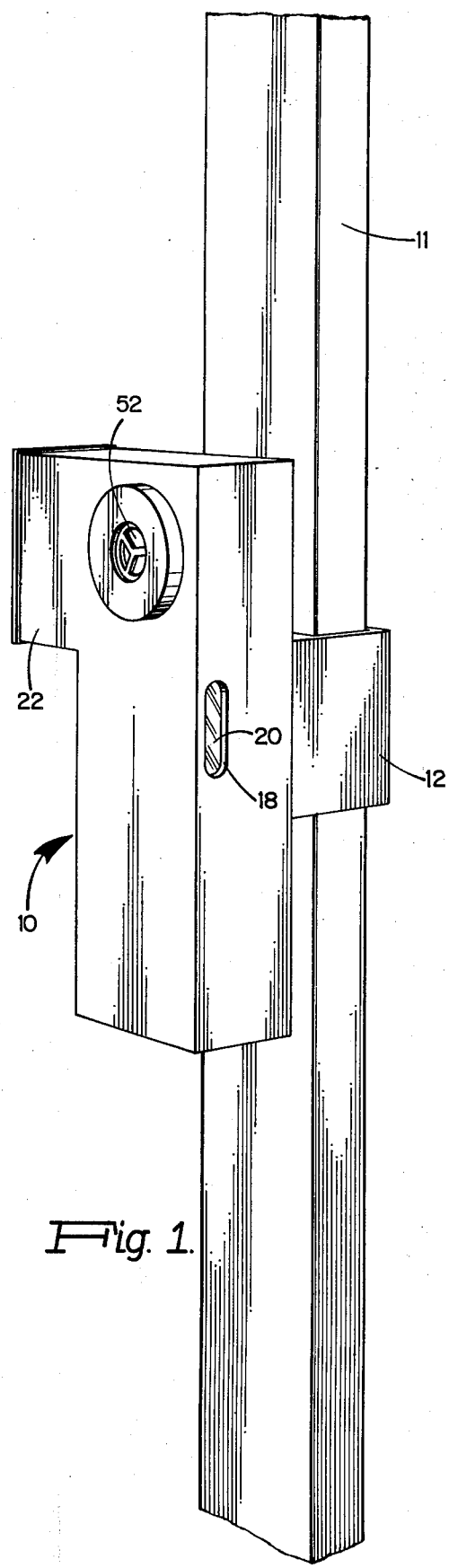
FIG. 1 is a perspective view showing one side and the front of the inventive target.

The inventive target is a small one-piece unit designed to mount on a grade rod. In FIG. 1, electronic target 10 is depicted as mounted on grade rod 11 by frictional slide 12. Four photodetectors 14–17 (see FIG. 3) are positioned within window 18 behind optical bandpass filter 20. Window 18 is located in the front of target 10, while slide 12 is attached to the right side as viewed from the front. Sonic indicator 52 is located on the left side of target 10 and portion 22 of target 10 projects behind grade rod 11 for viewing of visible indicators 24–27 (see FIG. 3) within window 28 (see FIG. 2).

Figure 2:
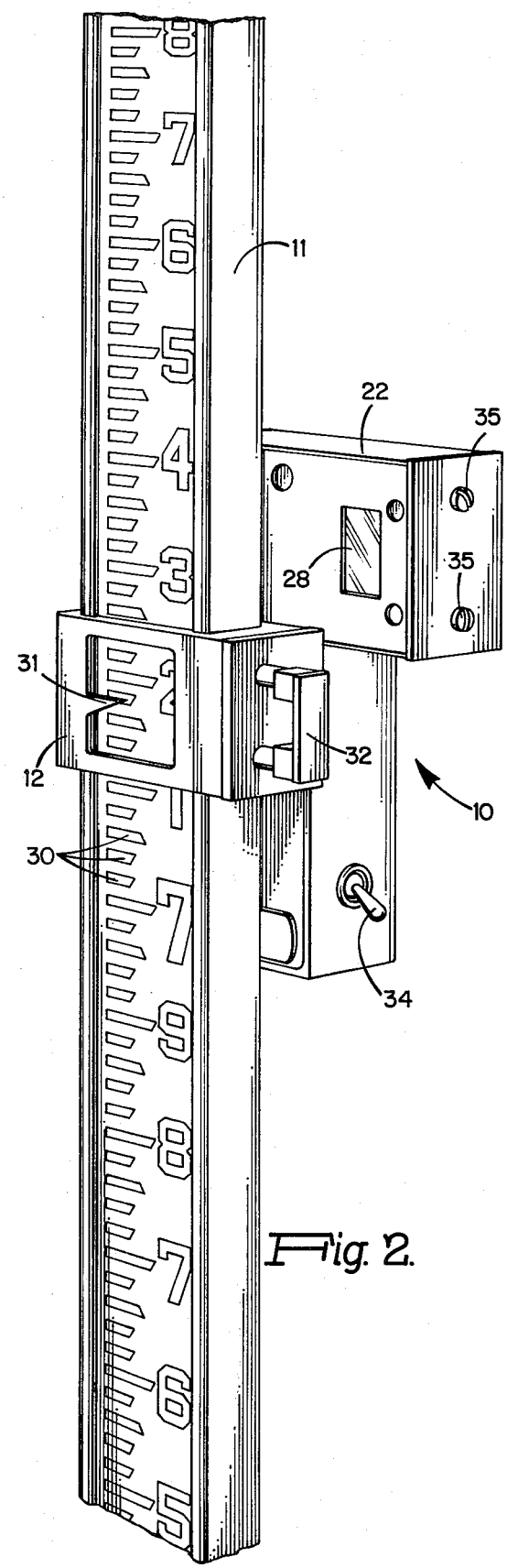
FIG. 2 is a side elevation showing the side opposite that of FIG. 1.

In FIG. 2, looking at the right side of target 10, scale 30 of grade rod 11 is exposed. A reticle or pointer 31 connected to slide 12 is in line with the midpoint of photodetectors 14–17. Spring-loaded friction damper 32 maintains target 10 in any position on rod 11. Damper 32 is designed for manual release as an aid for rapid movement or for insertion or removal from grade rod 11. Switch 34 is provided as an electrical off-on switch. Screws 35 attach a battery cover for battery replacement purposes. By reference to the scale on the grade rod, it will be seen that the whole unit is only about $3 \times 5 \times 1$ inch neglecting slide 12.

A simplified diagram of the electronic circuit is shown in FIG. 3. Optical bandpass filter 20 is a single filter in front of all four photodetectors 14–17. Filter 20 is suitably an interference filter having a narrow passband centered around the expected frequency of the scanning light beam. Photodetectors 14–17 are depicted as photodiodes each connected to a respective operational amplifier 36, 37, 38 and 40. The requirements for amplifiers 36, 37, 38 and 40 can vary widely, but generally an amplification factor of 1,000 is desirable.

A high pass filter is employed in each channel to reject sunlight in the sensitive band as well as other low frequency noise such as 60 cycle ac line radiation. While sunlight is high frequency radiation, it will be detected as dc or as very low frequency due to moving shadows. The desired signal will have a frequency characteristic of rise and fall determined by the scan speed and the size of the optical aperture. Preferably the cutoff of the filter will be above 120 cycles so that at least one harmonic of 60 cycles is blocked. High pass filters 41, 42, 44 and 45 are depicted in FIG. 3 connected between amplifiers 36, 37, 38 and 40 respectively and timers 46, 47, 48 and 50 respectively. The filters may alternatively be placed in front of amplifiers 36, 37, 38 and 40 or be in the form of feedback circuits around the amplifiers or input stages of the timers.

Timers 46, 47, 48 and 50 are functionally pulse stretchers. Both the visual and sonic indicators of the inventive target require some minimum time interval to provide an adequate signal for human attention. A reference beam scan rate may be 360° per second which even at a very short radius will illuminate the target for too short a time. One tenth second is an adequate time interval while the maximum time is desirably less than the cycle rate of the scanning beam. Integrated circuit timers such as the 555 timer available from Signetics, Sunnyvale, Calif. operate well.

The output of each timer, 46, 47, 48 and 50 is connected to indicator lights 24, 25, 26 and 27 respectively. Indicator lights 24, 25, 26 and 27 are depicted as light-emitting diodes (LEDs) but other illumination devices can be used. The output of each timer 46, 47, 48 and 50 is additionally connected to logic network 51. The output of network 51 is connected to sonic indicator 52. The statement for the logic can be written:

$$(A \cdot B \cdot C \cdot D) \vee (\overline{A} \cdot B \cdot C \cdot \overline{D}) = E$$

where $A$, $B$, $C$, and $D$ are output signals from timers 46, 47, 48 and 50 respectively and $E$ is an input drive signal to indicator 52. As depicted in FIG. 3, logic network 51 may be implemented with two AND gates 54 and 55 having four inputs each and one OR gate 56 having two inputs. The output of each timer 46, 47, 48 and 50 is connected to a respective input of AND gate 54. The output of each timer 47 and 48 is additionally connected to a respective input of AND gate 55. The output of each timer 46 and 50 is additionally connected to an inverter 57 and 58 respectively which are in turn connected as third and fourth inputs to AND gate 55. The output of AND gate 54 and the output of AND gate 55 are connected as the two inputs to OR gate 56.

Switch 34 connects battery 60 to energize the circuit. A small 9-volt battery such as NEDA No. 1604 has been found adequate as a power source.

FIG. 4 is a functional block diagram of one channel of FIG. 3. Optical filter 20 filters the light input to photodetector 14 as a bandpass filter. Amplifier 36 amplifies the output of photodetector 14 and is followed by highpass filter 41 which rejects low frequency interference. Timer 46 extends the pulse length of the filtered signal and drives both light indicator 24 and one input of logic network 51.

In the most usual contemplated use, target 10 is mounted on grade pole 11 by manually retracting friction damper 32 and sliding slide 12 over the rod. The unit is energized by switch 34 and roughly positioned slightly off from a scanning beam by eye. The target is then pushed along the rod in the direction of intercept until signal acquisition is flashed by one or more of lights 24–27. Fine adjustment is then made so that only the center two or all four lights are illuminated. Centering is further indicated audibly by sonic indicator 52. Accuracy has been ±0.01 feet at 250 feet from the scanning source.

While the invention has been described with relation to a specific embodiment, variations are contemplated as within the scope of the invention. For example, an external power source may be used instead of a self-enclosed battery. The logic can also take various forms. One useful form is the inverse of that described above in accordance with DeMorgan's theorem. The inverted logic has the useful feature that the sonic indicator will energize continuously whenever the battery power falls too low to drive the preceding stages. This effectively makes the device inoperative when there is insufficient power for accurate results. Thus it is the intent to cover these and other variations that would be apparent to those skilled in the art and as set forth in the scope of the appended claims.

We claim:

1. An electronic target for detecting scanning light reference beams comprising:
    a. First, second, third and fourth light detectors arranged in a fixed row;
    b. four timers each connected to a respective one of said detectors;
    c. four light-emitting devices each connected to the output of a respective one of said timers;
    d. logic means connected to the output of said timers to provide an output signal responsive to either reference beam acquisition by all four of said detectors or only the second and third of said detectors;
    e. a sonic indicator connected to said logic means and driven thereby to provide said output signal audibly, repeating at the scan cycle rate of the reference beam, said light-emitting devices serving to indicate the direction of misalignment in the absence of said output signal; and,
    f. a housing containing all said light-emitting devices, light detectors, timers, logic means and sonic indicator, said light detectors lying behind a first aperture in said housing behind an optical bandpass filter and all said light-emitting devices lying behind a second aperture in said housing, said second aperture lying in a plane perpendicular to said first aperture.

* * * * *